(12) United States Patent
Sreenivasan et al.

(10) Patent No.: US 10,700,987 B2
(45) Date of Patent: Jun. 30, 2020

(54) SYSTEM AND METHOD FOR TRANSMITTING DATA OVER A COMMUNICATION NETWORK

(71) Applicant: Wipro Limited, Bangalore (IN)

(72) Inventors: Sujeet Sreenivasan, Bangalore (IN); Harish Nair Rajagopal, Trivandrum (IN)

(73) Assignee: Wipro Limited, Bangalore (IN)

( * ) Notice: Subject to any disclaimer, the term of this patent is extended or adjusted under 35 U.S.C. 154(b) by 234 days.

(21) Appl. No.: 15/297,628

(22) Filed: Oct. 19, 2016

(65) Prior Publication Data

US 2018/0077075 A1    Mar. 15, 2018

(30) Foreign Application Priority Data

Sep. 9, 2016 (IN) .............................. 201641030779

(51) Int. Cl.
| | | |
|---|---|---|
| *H04L 12/805* | (2013.01) | |
| *H04L 12/721* | (2013.01) | |
| *H04L 12/717* | (2013.01) | |

(52) U.S. Cl.
CPC .......... *H04L 47/365* (2013.01); *H04L 45/127* (2013.01); *H04L 45/26* (2013.01); *H04L 45/42* (2013.01); *H04L 47/36* (2013.01)

(58) Field of Classification Search
CPC ..... H04L 47/365; H04L 45/127; H04L 45/26; H04L 45/42; H04L 47/36
See application file for complete search history.

(56) References Cited

U.S. PATENT DOCUMENTS

| | | | | | |
|---|---|---|---|---|---|
| 5,367,517 | A | * | 11/1994 | Cidon ................. | H04L 12/5602 370/230 |
| 7,103,674 | B2 | * | 9/2006 | Brown .................... | H04L 47/10 379/229 |
| 2003/0185208 | A1 | * | 10/2003 | Lee ......................... | H04L 45/12 370/389 |

(Continued)

FOREIGN PATENT DOCUMENTS

WO     2004075487 A1     9/2004

*Primary Examiner* — Christopher M Crutchfield
*Assistant Examiner* — Tito Q Pham
(74) *Attorney, Agent, or Firm* — Finnegan, Henderson, Farabow, Garrett & Dunner, LLP

(57) ABSTRACT

A technique is provided for transmitting data over a communication network. The technique comprises identifying an optimum network path comprising intelligent intermediate nodes between a source node and a destination node, determining an optimum packet size of the optimum network path for transmitting data packets without fragmentation, transmitting each of the data packets from the source node to the destination node via the optimum network path at the optimum packet size, detecting at least one of a plausible fragmentation of a data packet being transmitted and an actual fragmentation of a transmitted data packet at one of the intelligent intermediate nodes, dynamically updating the optimum packet size of the optimum network path for transmitting remaining data packets without fragmentation based on the detection, and transmitting each of the remaining data packets from the source node to the destination node via the optimum network path at the updated optimum packet size.

15 Claims, 4 Drawing Sheets

(56) References Cited

U.S. PATENT DOCUMENTS

| | | | | |
|---|---|---|---|---|
| 2003/0188015 A1* | 10/2003 | Lee | ............... | H04L 69/16 709/238 |
| 2005/0281288 A1* | 12/2005 | Banerjee | ............... | H04L 47/10 370/477 |
| 2010/0091782 A1* | 4/2010 | Hiscock | ............... | H04L 47/10 370/412 |
| 2015/0071067 A1* | 3/2015 | Martin | ............... | G06F 11/2002 370/235 |
| 2016/0057070 A1* | 2/2016 | Saxena | ............... | H04L 47/365 370/392 |
| 2016/0164794 A1* | 6/2016 | Ramalingam | ............... | H04L 47/365 370/235 |

* cited by examiner

SYSTEM AND METHOD FOR TRANSMITTING DATA OVER A COMMUNICATION NETWORK

This application claims the benefit of Indian Patent Application Serial No. 201641030779 filed Sep. 9, 2016, which is hereby incorporated by reference in its entirety.

FIELD

This disclosure relates generally to communication network, and more particularly to system and method for transmitting data over a communication network.

BACKGROUND

Advancements in the field of communication network have increased the consumption of various data services such as voice over IP (VoIP), video streaming, and so forth. Such data services not only need good quality of service (QoS) to guarantee clarity but also effectiveness of the data transmission. For example, even if the highest QoS is set, there may be no control on the latency of the network due to essential network processing associated with data transmission such as packet fragmentation or packet dropping.

It is generally accepted that for efficient data transfer, the data packet size should be as large as possible. The larger the packets, the lesser the overhead associated with transferring the entire data. However, if a packet is larger than that which any intermediate node (e.g., a router) can process, the packet will be fragmented at that node. Packet fragmentation is performed to ensure that packets are passed on to the next node. As will be appreciated by those skilled in the art, the maximum size packet that a router can process without fragmenting the packet is called an MTU (maximum transmission unit). The maximum size packet that can be transferred from a source node to a destination node without fragmentation is called PMTU (path maximum transmission unit). Thus, the PMTU is a function of the maximum size packets that all intermediate nodes in a network path can process without fragmenting the packets. However, the PMTU is dynamic in nature and may vary over time. If the PMTU decreases during data transmission, the packets may still have to be fragmented. Packet fragmentation brings an additional processing and storage overhead for splitting of packet, storing of fragmented packets, and reassembly of fragmented packets, thereby degrading performance. For example, when a packet is fragmented or split into multiple parts, each part should contain enough information to allow for reassembly at the destination node. Further, if a fragment from a packet is lost or dropped then the entire packet has to be discarded and retransmitted. Further, in case the packets are lost or dropped by a node they are required to send reverse packet to the host indicating the reason for the drop. Lastly, some firewalls may not allow the fragments to be passed as the non-initial packets would be blocked if the packets do not arrive in order. In such scenarios, the host may not get any indication that the packets have been lost or dropped, thereby resulting in permanent loss of that packet during transmission.

In a traditional approach, when a packet needs to be sent on the network, the supported interface on the source node dictates the size of the packet being sent. In case the packet size is greater than the maximum size of the supported interface on the receiving node, the packet gets fragmented and additional fragment headers are added to the fragment and sent to the next node. The next node would then determine whether to forward the fragmented packet or drop the same. In case the node drops the packet then a reverse message indicated the reason for drop is sent. However, there is no guaranteed mechanism that exists so as to ensure that packets are not fragmented or lost in transition.

It is therefore desirable to provide a mechanism so as to avoid or restrict packet fragmentation and packet dropping at any node in the network path between the source node and the destination node due to restriction in packet size in the network path. It is also desirable to have intelligence with respect to the underlying hardware resources during transmission of data packets over a communication network.

SUMMARY

In one embodiment, a method for transmitting data over a communication network is disclosed. In one example, the method comprises identifying an optimum network path in a communication network between a source node and a destination node. The optimum network path comprises a plurality of intermediate nodes between the source node and the destination node, and the plurality of intermediate nodes comprises a plurality of intelligent intermediate nodes. The method further comprises determining an optimum packet size of the optimum network path for transmitting a plurality of data packets without fragmentation. The method further comprises transmitting each of the plurality of data packets from the source node to the destination node via the optimum network path at the optimum packet size. The method further comprises detecting at least one of a plausible fragmentation of a data packet being transmitted and an actual fragmentation of a transmitted data packet at one of the plurality of intelligent intermediate nodes. The method further comprises dynamically updating the optimum packet size of the optimum network path for transmitting remaining data packets of the plurality of data packets without fragmentation based on the detection. The method further comprises transmitting each of the remaining data packets from the source node to the destination node via the optimum network path at the updated optimum packet size.

In one embodiment, a network device for transmitting data over a communication network is disclosed. In one example, the network device comprises at least one processor and a memory communicatively coupled to the at least one processor. The memory stores processor-executable instructions, which, on execution, cause the processor to identify an optimum network path in the communication network between a source node and a destination node. The optimum network path comprises a plurality of intermediate nodes between the source node and the destination node, and the plurality of intermediate nodes comprises a plurality of intelligent intermediate nodes. The processor-executable instructions, on execution, further cause the processor to determine an optimum packet size of the optimum network path for transmitting a plurality of data packets without fragmentation. The processor-executable instructions, on execution, further cause the processor to transmit each of the plurality of data packets from the source node to the destination node via the optimum network path at the optimum packet size. The processor-executable instructions, on execution, further cause the processor to detect at least one of a plausible fragmentation of a data packet being transmitted and an actual fragmentation of a transmitted data packet at one of the plurality of intelligent intermediate nodes. The processor-executable instructions, on execution, further cause the processor to dynamically update the optimum packet size of the optimum network path for transmitting remaining data packets of the plurality of data packets without fragmentation based on the detection. The processor-executable instructions, on execution, further cause the processor to transmit each of the remaining data packets from the source node to the destination node via the optimum network path at the updated optimum packet size.

In one embodiment, a non-transitory computer-readable medium storing computer-executable instructions for transmitting data over a communication network is disclosed. In one example, the stored instructions, when executed by a processor, cause the processor to perform operations comprising identifying an optimum network path in a communication network between a source node and a destination node. The optimum network path comprises a plurality of intermediate nodes between the source node and the destination node, and the plurality of intermediate nodes comprises a plurality of intelligent intermediate nodes. The operations further comprise determining an optimum packet size of the optimum network path for transmitting a plurality of data packets without fragmentation. The operations further comprise transmitting each of the plurality of data packets from the source node to the destination node via the optimum network path at the optimum packet size. The operations further comprise detecting at least one of a plausible fragmentation of a data packet being transmitted and an actual fragmentation of a transmitted data packet at one of the plurality of intelligent intermediate nodes. The operations further comprise dynamically updating the optimum packet size of the optimum network path for transmitting remaining data packets of the plurality of data packets without fragmentation based on the detection. The operations further comprise transmitting each of the remaining data packets from the source node to the destination node via the optimum network path at the updated optimum packet size.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
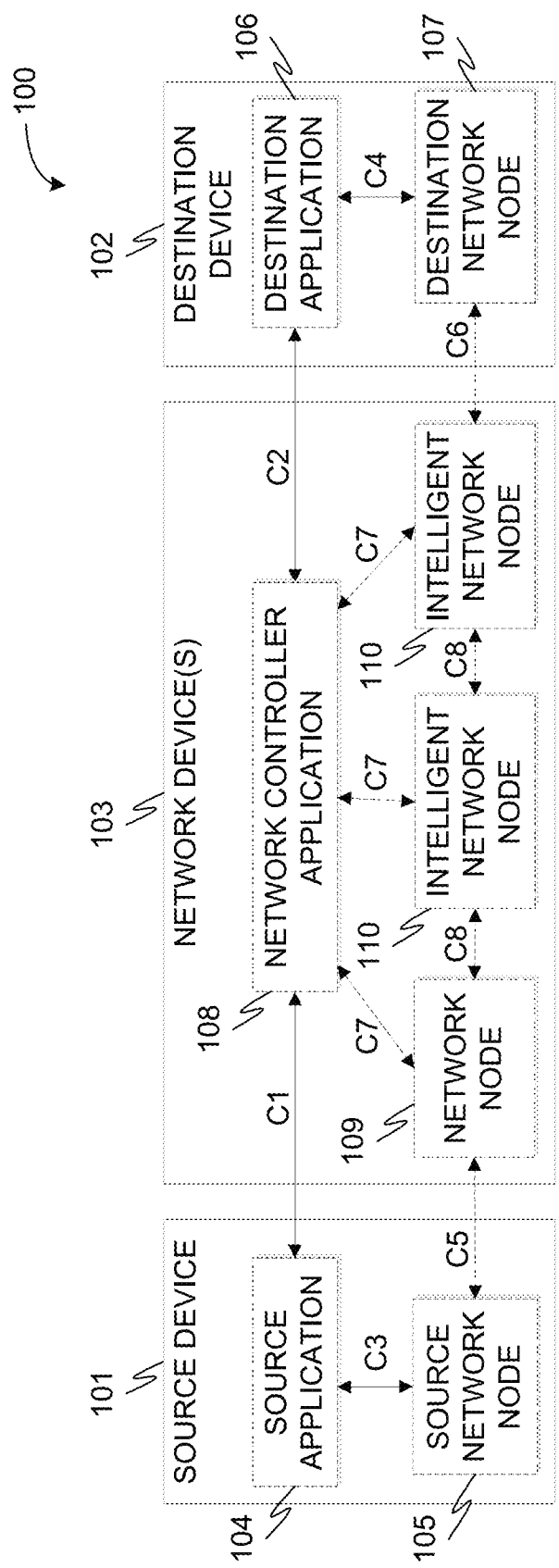
FIG. 1 is a block diagram of an exemplary system for transmitting data over a communication network in accordance with some embodiments of the present disclosure.

Referring now to FIG. 1, an exemplary system 100 for transmitting data over a communication network is illustrated in accordance with some embodiments of the present disclosure. As will be described in greater detail in conjunction with FIG. 2, the system 100 identifies an optimum network path comprising intelligent intermediate nodes between a source node and a destination node, determines an optimum packet size of the optimum network path for transmitting data packets without fragmentation, transmits each of the data packets from the source node to the destination node via the optimum network path at the optimum packet size, detects at least one of a plausible fragmentation of a data packet being transmitted and an actual fragmentation of a transmitted data packet at one of the intelligent intermediate nodes, dynamically updates the optimum packet size of the optimum network path for transmitting remaining data packets without fragmentation based on the detection, and transmits each of the remaining data packets from the source node to the destination node via the optimum network path at the updated optimum packet size.

The system 100 comprises a network of computing devices (e.g., a computer, a server, a digital device, a router, a modem, a bridge, a switch, etc.) for sending or receiving various data. In one embodiment, the system 100 comprises a source device 101, a destination device 102, and a plurality of networked devices 103 in communication with each other over a wired or wireless communication network. Each of the computing devices further comprises one or more processors and a computer-readable medium (e.g., a memory). The computer-readable storage medium stores instructions that, when executed by the one or more processors, cause the one or more processors to perform data reception and transmission in accordance with aspects of the present disclosure. The computer-readable storage medium may also store various data (e.g., optimal network path, optimal packet size, data packets, current packet size of a node, etc.) that may be captured, processed, and/or required by the system 100.

The source device 101 comprises a source application module 104 that initiates data transmission (e.g., streaming of video) using a source network node module 105. Similarly, the destination device 102 comprises a destination application module 106 that receives data (e.g., streaming data) from the source application module 104 via the destination network node module 107. The source application module 104 and the destination application module 106 communicate with a network controller application module 108 via communication interfaces C1 and C2 respectively. Additionally, the source application module 104 communicates with the source network node module 105 via a communication interface C3 and controls the same. Similarly, the destination application module 106 communicates with the destination network node module 107 via a communication interface C4 and controls the same.

The source network node module 105 sets up connection to the destination network node module 107 and sends data packets to the destination network node module 107 via one or more intermediate network node modules 109. It should be noted that the one or more intermediate network node modules 109 may include one or more intelligent intermediate network node modules 110 in accordance with some embodiments of the present disclosure. The source network node module 105 communicates with the intermediate network node module 109 or the intelligent intermediate network node module 110 via communication interface C5. Further, the source network node module 105 determines the network packet size i.e., maximum transmission unit (MTU) for sending the upper layer data. Additionally, the source network node module 105 sets packet preferences for fragmentation. Moreover, the source network node module 105 processes any acknowledgments received on packet reception from the destination network node module 107.

The destination network node module 107 receives network packets from the source network node module 105 via one or more intermediate network node modules 109 and the one or more intelligent intermediate network node modules 110. The destination network node module 107 communicates with the intermediate network node module 109 or the intelligent intermediate network node 110 module via communication interface C6. Further, the destination network node module 107 determines the network packet MTU size for receiving the upper layer data and sends any acknowledgments on packet reception to the source network node module 105.

The networked devices 103 comprise the network controller application module 108 which collects information on and sets configurations for underlying hardware resource settings from the source network node module 105, destination network node module 107, legacy intermediate network node modules 109, and intelligent intermediate network node modules 110. It should be noted that the network controller application module 108 communicates with the intermediate network node modules 109 or the intelligent intermediate network node modules 110 via communication interfaces C7. The network controller application module 108 further determines quality of service (QoS) for the source application module 104 and destination application module 106 based on pre-defined settings.

The intermediate network node modules 109 or the intelligent intermediate network node modules 110 receive packets from the source network node module 105, or another legacy or intelligent intermediate network node modules 109, 110, and forwards packets to the next legacy or intelligent intermediate network node modules 109,110 or the destination network node module 107 based on instruction from the network controller application module 108. The legacy or intelligent intermediate network node modules 109, 110 reassemble data packets or extract data packets from encapsulation on receiving data packets when necessary, fragment data packets when necessary, or encapsulate data packets for sending when necessary. The legacy or intelligent intermediate network node modules 109, 110 communicate with each other via communication interfaces C8. It should be noted that the communication interfaces C1, C2, C3, C4, C5, C6, C7, and C8 are API based interface, which enable the hardware and software based modules of exemplary system 100 to directly interact or indirectly interact with one another.

It should be noted that the various modules described above may be implemented in programmable hardware devices such as programmable gate arrays, programmable array logic, programmable logic devices, and so forth. Alternatively, the various modules described above may be implemented in software for execution by various types of processors. An identified module of executable code may, for instance, comprise one or more physical or logical blocks of computer instructions which may, for instance, be organized as an object, procedure, function, engine, or other construct. Nevertheless, the executables of an identified module need not be physically located together, but may comprise disparate instructions stored in different locations which, when joined logically together, comprise the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for transmitting data over a communication network. For example, the exemplary system 100 may transmit data over a communication network by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 2:
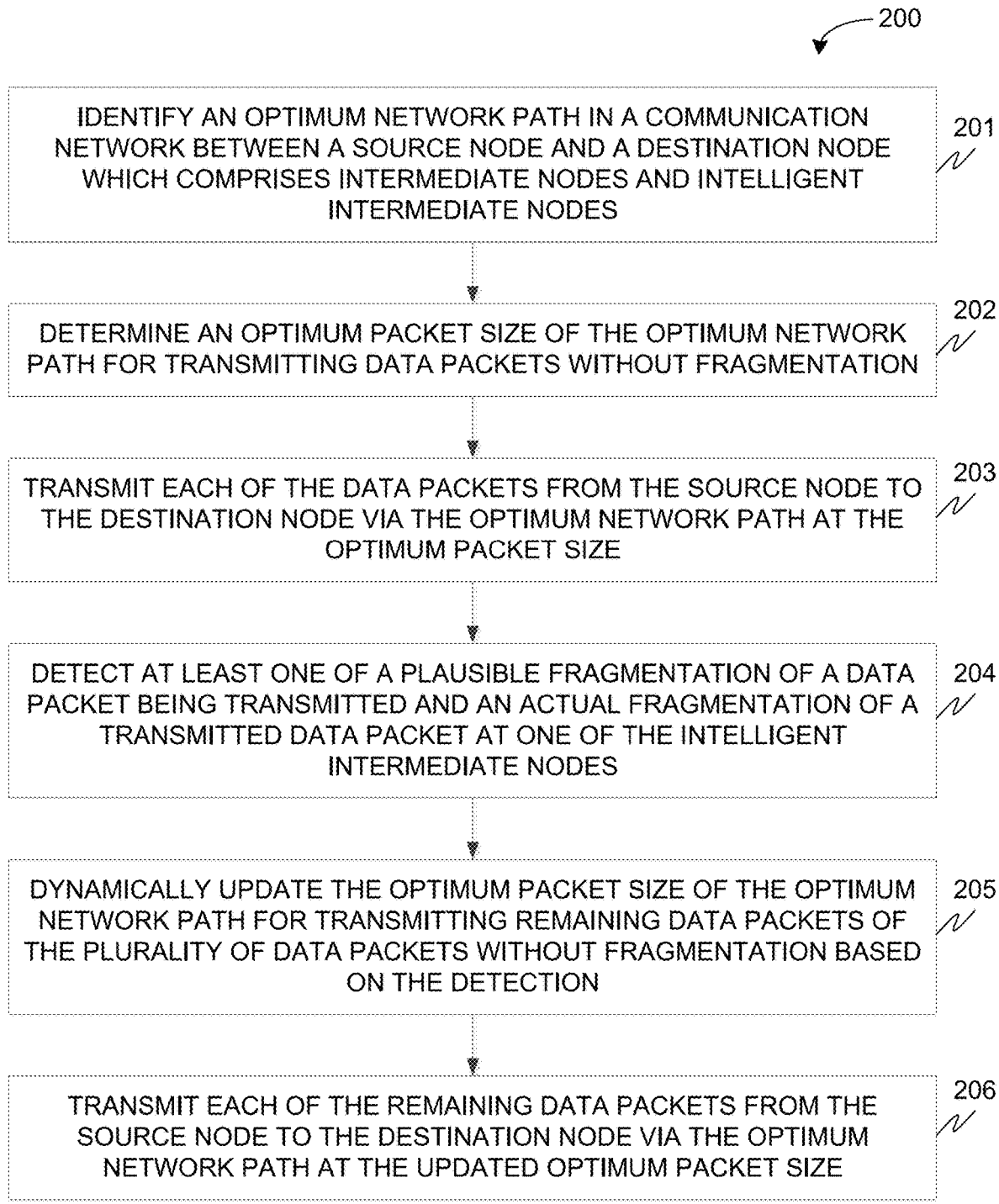
FIG. 2 is a flow diagram of an exemplary process for transmitting data over a communication network in accordance with some embodiments of the present disclosure.

For example, referring now to FIG. 2, exemplary control logic 200 for transmitting data over a communication network via a system, such as system 100, is depicted via a flowchart in accordance with some embodiments of the present disclosure. As illustrated in the flowchart, the control logic 200 includes the step of identifying an optimum network path in the communication network between a source node and a destination node at step 201. The optimum network path comprises a plurality of intermediate nodes between the source node and the destination node, and the plurality of intermediate nodes comprises a plurality of intelligent intermediate nodes. The control logic 200 further includes the steps of determining an optimum packet size of the optimum network path for transmitting a plurality of data packets without fragmentation at step 202, transmitting each of the plurality of data packets from the source node to the destination node via the optimum network path at the optimum packet size at step 203, detecting at least one of a plausible fragmentation of a data packet being transmitted and an actual fragmentation of a transmitted data packet at one of the plurality of intelligent intermediate nodes at step 204, dynamically updating the optimum packet size of the optimum network path for transmitting remaining data packets of the plurality of data packets without fragmentation based on the detection at step 205, and transmitting each of the remaining data packets from the source node to the destination node via the optimum network path at the updated optimum packet size at step 206.

In some embodiments, determining the optimum packet size of the optimum network path at step 202 comprises determining a minimum packet size from a plurality of maximum packet sizes corresponding to the plurality of intermediate nodes in the optimum network path. Further, in some embodiments, determining the plurality of maximum packet sizes comprises transmitting a discovery data packet from the source node to the destination node via the optimum network path at a pre-determined packet size, determining a successful reception of the discovery data packet at the destination node, and upon the successful reception, determining a maximum packet size corresponding to each of the plurality of intermediate nodes.

Further, in some embodiments, detecting at step 204 comprises detecting a need to fragment the data packet being transmitted from one of the plurality of intelligent intermediate nodes, or detecting fragmentation of the transmitted data packet at one of the plurality of intelligent intermediate nodes. Additionally, in some embodiments, dynamically updating the optimum packet size of the optimum network path at step 205 comprises determining a new maximum packet size corresponding to a node at which the data packet being transmitted needs to be fragmented or a node at which the transmitted data packet is fragmented, and dynamically determining a new optimum packet size of the optimum network path based on the new maximum packet size.

Figure 3:
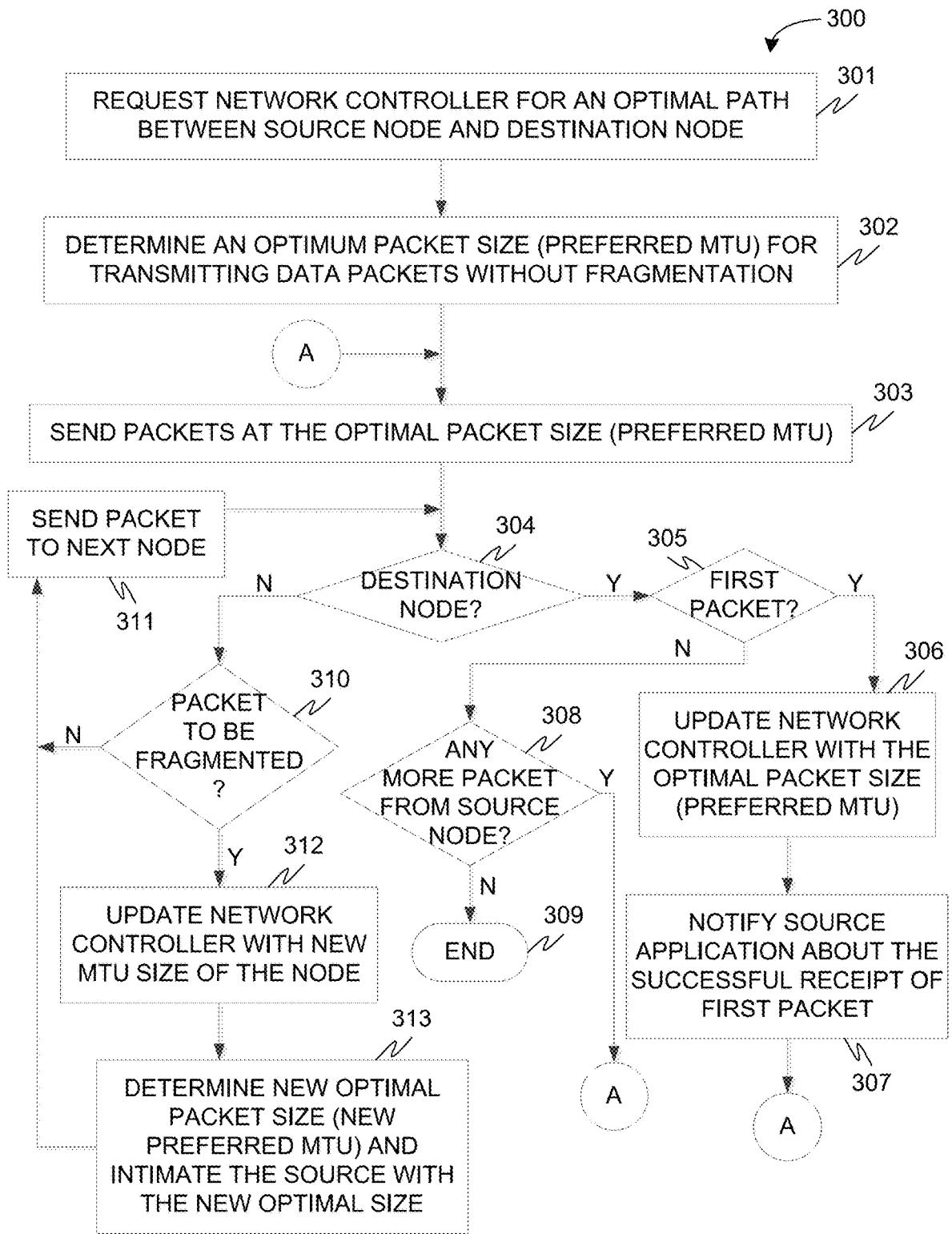
FIG. 3 is a flow diagram of a detailed exemplary process for transmitting data over a communication network in accordance with some embodiments of the present disclosure.

Referring now to FIG. 3, exemplary control logic 300 for transmitting data over a communication network is depicted in greater detail via a flowchart in accordance with some embodiments of the present disclosure. As illustrated in the flowchart, the control logic 300 includes the step of requesting the network controller application to provide an optimal network path between the source node and destination node at step 301. As will be appreciated by those skilled in the art, the request is made by the source application. Further, the source application queries the network controller application with the destination details.

The control logic 300 further includes the step of determining an optimal packet size for transmitting data packets without fragmentation at step 302. The network controller application first determines the one or more legacy or intelligent network nodes which are to be configured to create the optimal network path between the source application node and the destination application node. The network controller application then determines the optimal size of the packet that may be sent over the entire network path without effecting fragmentation. In some embodiments, the optimal packet size may be determined by taking the minimum of the maximum packet sizes (i.e., MTU) from each of the network nodes. This preferred MTU may then be passed on to the source application as the optimal packet size.

The control logic 300 further includes the step of transmitting data packets at the optimal packet size at step 303. Thus, the source application which receives the optimal packet size (i.e., preferred MTU) may then transmit the data packets at the packet size via the optimal network path requested from the network controller application. The data packets transmitted by the source node is received by the legacy or intelligent node and passed on to the next legacy or intelligent node until it reaches the destination node.

The control logic 300 further includes the step of determining if the node receiving the transmitted data packet is the destination network node or not at step 304. If the determination at step 304 is positive (i.e., if the data packet has reached the destination node), then the control logic 300 includes the step of determining if the data packet is the first packet or the discovery packet transmitted between source network node and the destination network node at step 305. If the determination at step 305 is positive (i.e., if the data packet is the first packet or the discovery packet), then the control logic 300 includes the step of updating the network controller application with the optimal packet size (i.e., preferred MTU) for the network path or with the maximum packet sizes (i.e., MTU) for each of the intermediate nodes in the network path which then enables the determination of the optimal packet size for the network path (i.e., preferred MTU) at step 306. This marks the completion of the discovery process. It should be noted that the update to the network controller application is provided by the destination network node. The control logic 300 further includes the step of notifying the source application about the successful receipt of the first packet or the discovery packet along with the optimized packet size (i.e., preferred MTU) at step 307. As will be appreciated, the notification to the source application is provided by the network controller application. The control logic 300 then flows back to step 303.

However, if the determination at step 305 is negative (i.e., if the data packet is a regular data packet or is not the first packet or the discovery packet), then the control logic 300 includes the step of determining if there are any more data packets from the source node at step 308. If the determination at step 308 is positive (i.e., there are more packets that need to be transmitted), then the control logic 300 flows back to step 303. However, if the determination at step 308 is negative (i.e., there are no further packets that need to be transmitted), then the control logic 300 ends at step 309.

If the determination at step 304 is negative (i.e., if the data packet has not reached the destination node), then the control logic 300 includes the step of determining if the data packet being transmitted needs to be possibly fragmented or if the transmitted data packet is actually fragmented at one of the intelligent intermediate nodes at step 310. If the determination at step 310 is negative (i.e., if there is no plausible or actual fragmentation), then the control logic 300 includes the step of forwarding the data packet from the current intelligent intermediate node to the next intermediate network node or the destination network node at step 311.

However, if the determination at step 310 is positive (i.e., if there is at least one of a plausible and an actual fragmentation), the control logic 300 optimizes the packet size of the network path, i.e., optimizes the preferred MTU and provides corresponding feedback to the source application. The control logic 300 first includes the step of updating the network controller application with new maximum packet size (i.e., MTU) for the current node at which plausible fragmentation may occur or for the previous node at which actual fragmentation has occurred at step 312. In other words, the current intelligent intermediate network node determines a need to fragment the data packet for subsequent transmission or receives a fragmented data packet from a previous non-intelligent legacy network node. The current intelligent intermediate network node then indicates the same to the network controller application so as to reduce the maximum packet size (i.e., MTU) of the current node or that of the previous non-intelligent legacy network node. It then forwards the packet to the next intermediate network node or the destination network node.

The control logic 300 then includes the step of determining a new optimal packet size (i.e., new preferred MTU) and intimating the source application with the new optimal packet size (i.e., new preferred MTU) at step 313. The network controller application on receiving the maximum packet size (i.e., MTU) changes from any intelligent network node, determines the new optimal packet size (i.e., new preferred MTU) and updates the source application with the determined new the new optimal packet size (i.e., preferred MTU). The network controller application uses the updated MTU sizes of the intermediate nodes and recalculates the new optimal packet size (i.e., preferred MTU) by taking the minimum of the new maximum packet sizes (i.e., MTU) of the nodes. This information is then passed back to the source application so that next data packet is transmitted at the updated new optimal packet size (i.e., new preferred MTU). The control logic 300 then flows back to step 311 so as to transmit remaining data packets to the next intermediate network node or the destination network node at the new optimal packet size (i.e., new preferred MTU).

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 4:
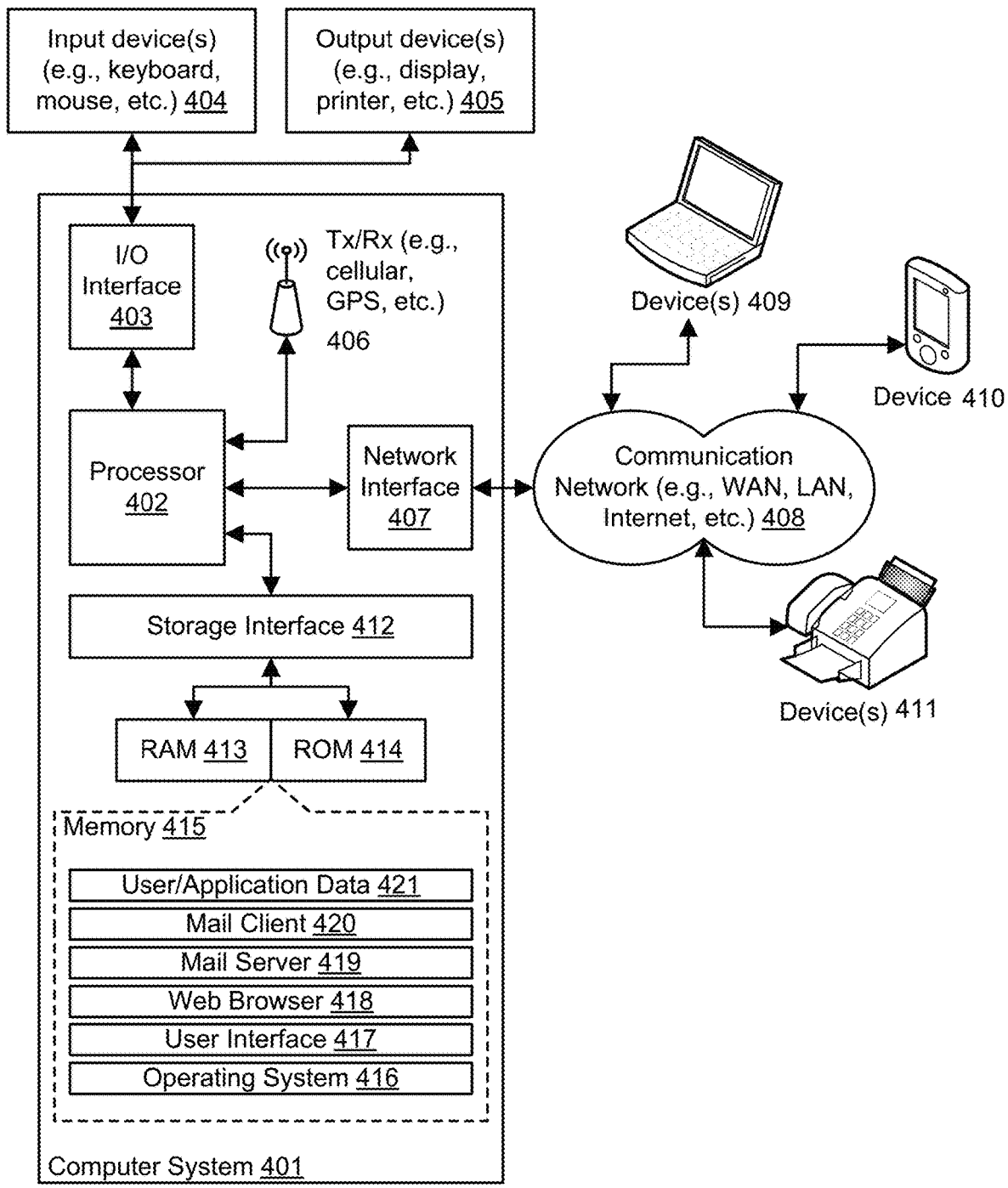
FIG. 4 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 4, a block diagram of an exemplary computer system 401 for implementing embodiments consistent with the present disclosure is illustrated. Variations of computer system 401 may be used for implementing system 100 for transmitting data over a communication network. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., past ticket repository, keywords, Ngrams, clusters or categories, relationship mapping, user queries, resolutions, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for dynamic determination of optimal packet size (i.e., preferred MTU) for transmitting data packets over a communication network, thereby avoiding or restricting packet fragmentation and packet dropping at any node in the network path due to restriction in packet size. The techniques provide for centralized view of maximum packet size (i.e., MTU) from all the nodes in the network path. This means that the transmission of data packets starts out with a pre-optimized packet size (i.e., preferred MTU). Further, in case of any variations or any fragmentation at any intermediate node, the intermediate node intimates the network controller application which in turn determines a new optimal packet size (i.e., new preferred MTU) and intimates the same to the source application for transmission of remaining data packets. Thus, the techniques not only result in optimized packet size but also result in reduced network congestion and shorter set-up time.

Additionally, the techniques described in the various embodiments discussed above are platform agnostic and may therefore be implemented across various data packet transmission technologies. The techniques do not require any changes in the packet header or modification of the packet. Further, the techniques do not use ICMP messages (which could be potentially dropped by network) and instead uses the network controller to send intimations to the source application more reliably.

Moreover, the techniques described in the various embodiments discussed above may be applied for an intelligent, low latency streaming network connection setup so as to stream low-latency digital content. The techniques ensure that low latency streaming network connection setup is achieved by minimizing packet loss due to fragmentation. As described above, this is achieved by determining an optimal packet size (i.e., preferred MTU) for a given network path between the source node and the destination node for transmission of data packets. The optimal packet size (i.e., preferred MTU) may be dynamically updated during the transmission of the data packet so as to accommodate any dynamic changes of the maximum packet sizes (i.e., MTUs) at any of the intermediate nodes for the chosen network path.

The specification has described system and method for transmitting data over a communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for transmitting data over communication networks implemented by a network device, the method comprising:

identifying an optimum network path in a communication network between a source node and a destination node, wherein the optimum network path is through one or more of a plurality of intelligent intermediate nodes between the source node and the destination node;

determining an optimum packet size of the optimum network path for transmitting a plurality of data packets without fragmentation;

transmitting one or more of the plurality of data packets from the source node to the destination node via the optimum network path based on the optimum packet size;

detecting a plausible fragmentation of a first one of the plurality of data packets to be transmitted from a current one of the plurality of intelligent intermediate nodes and an actual fragmentation of a second one of the transmitted one or more of the plurality of data packets at a previous one of the plurality of intelligent intermediate nodes during transmission of the one or more of the plurality of data packets over the optimum network path;

dynamically updating the optimum packet size of the optimum network path for transmitting one or more remaining ones of the plurality of data packets without fragmentation based on the detection, wherein dynamically updating the optimum packet size comprises dynamically determining a new maximum packet size corresponding to one of the plurality of intelligent intermediate nodes at which the second one of the transmitted one or more of the plurality of data packets was fragmented; and transmitting each of the one or more remaining ones of the plurality of data packets from the source node to the destination node via the optimum network path based on the updated optimum packet size.

2. The method of claim 1, further comprising determining a minimum packet size from a plurality of maximum packet sizes corresponding to the plurality of intelligent intermediate nodes in the optimum network path.

3. The method of claim 2, further comprising:

transmitting a discovery data packet from the source node to the destination node via the optimum network path based on a pre-determined packet size;

determining when there is a successful reception of the discovery data packet at the destination node; and determining one of the plurality of maximum packet sizes corresponding to each of the plurality of intelligent intermediate nodes, when the determining indicates that there is a successful reception of the discovery data packet at the destination node.

4. The method of claim 1, further comprising detecting when the first one of the plurality of data packets to be transmitted requires fragmentation or the second one of the one or more transmitted data packets was fragmented at one of the intelligent intermediate nodes.

5. The method of claim 1, wherein dynamically updating the optimum packet size further comprises:

determining a new maximum packet size corresponding to one of the intelligent intermediate nodes at which the first one of the plurality of data packets to be transmitted requires fragmentation; and dynamically determining a new optimum packet size of the optimum network path based on the new maximum packet size.

6. A network device comprising memory comprising programmed instructions stored therein and one or more processors coupled to the memory and configured to be capable of executing the stored programmed instructions to:

identify an optimum network path in a communication network between a source node and a destination node, wherein the optimum network path is through one or more of a plurality of intelligent intermediate nodes between the source node and the destination node;

determine an optimum packet size of the optimum network path for transmitting a plurality of data packets without fragmentation;

transmit one or more of the plurality of data packets from the source node to the destination node via the optimum network path based on the optimum packet size;

detect a plausible fragmentation of a first one of the plurality of data packets to be transmitted from a current one of the plurality of intelligent intermediate nodes and an actual fragmentation of a second one of the transmitted one or more of the plurality of data packets at a previous one of the plurality of intelligent intermediate nodes during transmission of the one or more of the plurality of data packets over the optimum network path;

dynamically update the optimum packet size of the optimum network path for transmitting one or more remaining ones of the plurality of data packets without fragmentation based on the detection, wherein dynamically updating the optimum packet size comprises dynamically determining a new maximum packet size corresponding to one of the plurality of intelligent intermediate nodes at which the second one of the transmitted one or more of the plurality of data packets was fragmented; and transmit each of the one or more remaining ones of the plurality of data packets from the source node to the destination node via the optimum network path based on the updated optimum packet size.

7. The network device of claim 6, wherein the one or more processors are further configured to be capable of executing the stored programmed instructions to determine a minimum packet size from a plurality of maximum packet sizes corresponding to the plurality of intelligent intermediate nodes in the optimum network path.

8. The network device of claim 7, wherein the one or more processors are further configured to be capable of executing the stored programmed instructions to:

transmit a discovery data packet from the source node to the destination node via the optimum network path based on a pre-determined packet size;

determine when there is a successful reception of the discovery data packet at the destination node; and determine one of the plurality of maximum packet sizes corresponding to each of the plurality of intelligent intermediate nodes, when the determining indicates that there is a successful reception of the discovery data packet at the destination node.

9. The network device of claim 6, wherein the one or more processors are further configured to be capable of executing the stored programmed instructions to detect when the first one of the plurality of data packets to be transmitted requires fragmentation or the second one of the one or more transmitted data packets was fragmented at one of the intelligent intermediate nodes.

10. The network device of claim 6, wherein dynamically updating the optimum packet size further comprises:
   determine a new maximum packet size corresponding to one of the intelligent intermediate nodes at which the first one of the plurality of data packets to be transmitted requires fragmentation; and
   dynamically determine a new optimum packet size of the optimum network path based on the new maximum packet size.

11. A non-transitory computer-readable medium comprising executable instructions for transmitting data over communication networks, which, when executed by one or more processors, cause the one or more processors to:
   identify an optimum network path in a communication network between a source node and a destination node, wherein the optimum network path is through one or more of a plurality of intelligent intermediate nodes between the source node and the destination node;
   determine an optimum packet size of the optimum network path for transmitting a plurality of data packets without fragmentation;
   transmit one or more of the plurality of data packets from the source node to the destination node via the optimum network path based on the optimum packet size;
   detect a plausible fragmentation of a first one of the plurality of data packets to be transmitted from a current one of the plurality of intelligent intermediate nodes and an actual fragmentation of a second one of the transmitted one or more of the plurality of data packets at a previous one of the plurality of intelligent intermediate nodes during transmission of the one or more of the plurality of data packets over the optimum network path;
   dynamically update the optimum packet size of the optimum network path for transmitting one or more remaining ones of the plurality of data packets without fragmentation based on the detection, wherein dynamically updating the optimum packet size comprises dynamically determining a new maximum packet size corresponding to one of the plurality of intelligent intermediate nodes at which the second one of the transmitted one or more of the plurality of data packets was fragmented; and
   transmit each of the one or more remaining ones of the plurality of data packets from the source node to the destination node via the optimum network path based on the updated optimum packet size.

12. The non-transitory computer-readable medium of claim 11, wherein the executable instructions, when executed by the one or more processors, further cause the one or more processors to determine a minimum packet size from a plurality of maximum packet sizes corresponding to the plurality of intelligent intermediate nodes in the optimum network path.

13. The non-transitory computer-readable medium of claim 12, wherein the executable instructions, when executed by the one or more processors, further cause the one or more processors to:
   transmit a discovery data packet from the source node to the destination node via the optimum network path based on a pre-determined packet size;
   determine when there is a successful reception of the discovery data packet at the destination node; and
   determine one of the plurality of maximum packet sizes corresponding to each of the plurality of intelligent intermediate nodes, when the determining indicates that there is a successful reception of the discovery data packet at the destination node.

14. The non-transitory computer-readable medium of claim 11, wherein the executable instructions, when executed by the one or more processors, further cause the one or more processors to detect when the first one of the plurality of data packets to be transmitted requires fragmentation or the second one of the one or more transmitted data packets was fragmented at one of the intelligent intermediate nodes.

15. The non-transitory computer-readable medium of claim 11, wherein dynamically updating the optimum packet size further comprises:
   determining a new maximum packet size corresponding to one of the intelligent intermediate nodes at which the first one of the plurality of data packets to be transmitted requires fragmentation; and
   dynamically determining a new optimum packet size of the optimum network path based on the new maximum packet size.

* * * * *